Aug. 26, 1969 G. A. CARLSON ET AL 3,462,972

CABLE COUPLING

Filed Jan. 10 1968

INVENTORS
GEORGE A. CARLSON
DALE E. WELLER
SHELLIE O. WILLIAMSON

BY

ATTORNEYS

United States Patent Office 3,462,972
Patented Aug. 26, 1969

3,462,972
CABLE COUPLING
George A. Carlson, Dale E. Weller, and Shellie O. Williamson, Peoria, Ill., assignors to Caterpillar Tractor Co., Peoria, Ill., a corporation of California
Filed Jan. 10, 1968, Ser. No. 696,823
Int. Cl. F16d 3/54
U.S. Cl. 64—12                                4 Claims

ABSTRACT OF THE DISCLOSURE

An improved wire rope or cable coupling for isolating vibrations when transmitting torques between adjacent shafts coupled with the novel coupling, employs an outer housing having a circular recess therein and provisions to connect it to one of the shafts, an inner circular unit adapted to fit in the circular recess and having provisions for connecting it to the other shaft, said inner circular element having a plurality of freely rotating sheaves by which the inner circular unit is suspended within the circular recess on loops of a cable suspension system which has the ends of the cables adjustably anchored in the outer housing. Stops can be provided between the outer housing and inner unit to limit relative rotation resulting when excess stretching of the cable suspension system occurs from temporary overloads.

Background of the invention

Various devices employing wire rope or cable have been employed to couple the ends of adjacent shafts to transmit torque therebetween without accompanying vibration. Typical devices of this type ars shown in British Patent No. 1,043,866, issued to Camossi and British Patent No. 1,043,758, issued to Houdaille Industries, Inc. Devices of the above type generally employ short pieces of cable connected between elements mounted on adjacent shafts so coupled to transmit torque between the elements.

Such cable couplings have been employed in environments which are unsuitable for elastomers and where shock absorbing mechanical spring systems would require expensive structures. In addition, their low cost makes them attractive where they can meet the desired objective of the transmission of torque without the unwanted vibration.

The difficulty with the prior art cable coupling units have been a short service life and the inability to repair the coupling when failure occurs. Further, prior art devices have no means to adjust the cable preload which eventually allows lost motion to build up between a cable connected parts due to stretch in the cable units and subsequent failure of the coupling. Further, the short cable pieces often have their ends secured immediately adjacent to "flexing" areas, which restrict the energy of absorbing capacity of the cable and increases stiffness. Fatigue failure of the wire filaments making up the cable often result from these factors. In some of these coupling units, the cables are allowed to rub on supporting structures which also will reduce their service life.

The instant invention is designed to overcome many of the above problems and provides a common design which can be employed in a wide variety of circumstances since cable preload and/or substitute cables can be easily changed in the coupling unit.

Summary of the invention

The novel cable or wire rope coupling according to this invention includes an outer housing having a circular recess, a carrier unit received in the circular recess of the outer housing, said carrier unit having a plurality of sheaves mounted therein and a cable suspension system adjustably anchored to the housing and having a plurality of inwardly extending loops received on the sheaves to suspend the carrier element within the housing. Arcuate slots can be provided in the carrier element to receive dowels axially projecting from the housing to align the carrier unit within the housing and to provide limit stops should an unusual torque load occur wherein the normal stretching of the cable suspension system is exceeded.

Brief description of the drawings

The above advantages and construction of this invention will be more fully understood from the following description of a preferred embodiment, when taken in conjunction with the attached drawing, wherein.

Description of a preferred embodiment

Figure 1:
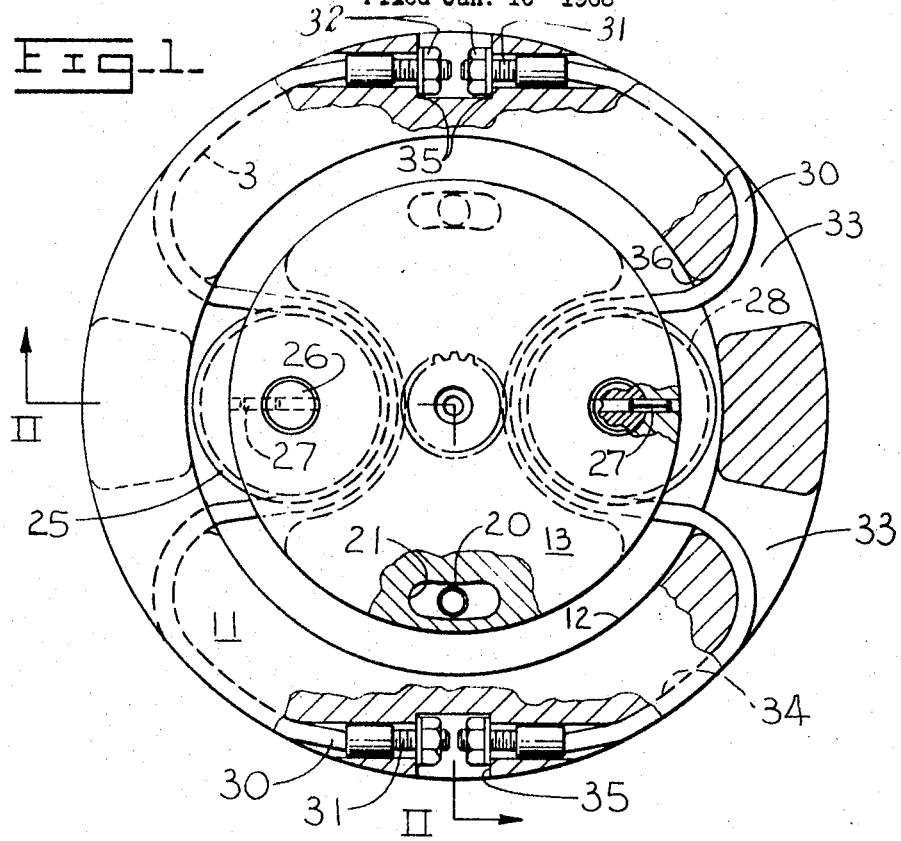
FIG. 1 is an elevation of the coupling, constructed according to this invention, wherein portions are broken away to show internal detail.

A coupling according to this invention, as shown in FIG. 1, can be used to transmit torque between an engine and a transmission with a considerable damping of vibration, or in some similar capacity, where vibration damping is required. A portion of the coupling can be integrally formed with conventional components, such as the engine flywheel, but for the purposes of description of this invention it will be discussed as a separate unit having component parts designed to be connected with adjacent shafts ends for torque interchange therebetween.

Generally, the novel coupling consists of an outer housing 11 having a circular recess 12 for receiving a carrier unit 13. Both the housing and the carrier include means to attach them to their respective shafts which are to be coupled for torque interchange with the coupling. For illustration, bolts 14 connect the housing to an output shaft to transmit torque in the direction of arrows 15 through the coupling to a shaft connected to the projecting splined stub shaft 16 of the carrier unit or member.

Basically the carrier unit is designed to "float" with in the circular recess in the housing on a cable suspension system so that the cable suspension system can absorb the vibration while accomplishing an interchange of torque between the housing and the carrier unit. Normally, it is desirable to employ a plurality of dowels 20, usually two, projecting axially from the housing into arcuate slots 21 of the carrier unit to center it within the circular recess. The dowel-slot fit is loose so the dowels do not affect a torque interchange between their respective parts and generally, the length of the arcuate slots are sufficient to allow the relative small movement occurring between the housing and carrier unit during normal torque interchange resulting from cable stretch in the suspension system.

By adjusting the cable suspension system properly, the dowels are located in the middle of their respective slots and provide a limit stop should the torque loads interchanged between their respective parts become excessive and cause unnatural cable stretch in the suspension system. This stop overload feature provides a desirable characteristic not found in other cable coupling units since it provides protection against temporary torque overloads and prevents premature failure of the coupling unit.

A unique cable suspension system is employed to support the carrier element within the circular recess of the housing which reduces cable wear to minimum, allows convenient preloading adjustment and provides easy cable replacement. In addition, since the carrier unit is suspended on the cable system, slight shaft misalignment across the coupling will be absorbed in the suspension system without binding or undue wear.

Figure 2:
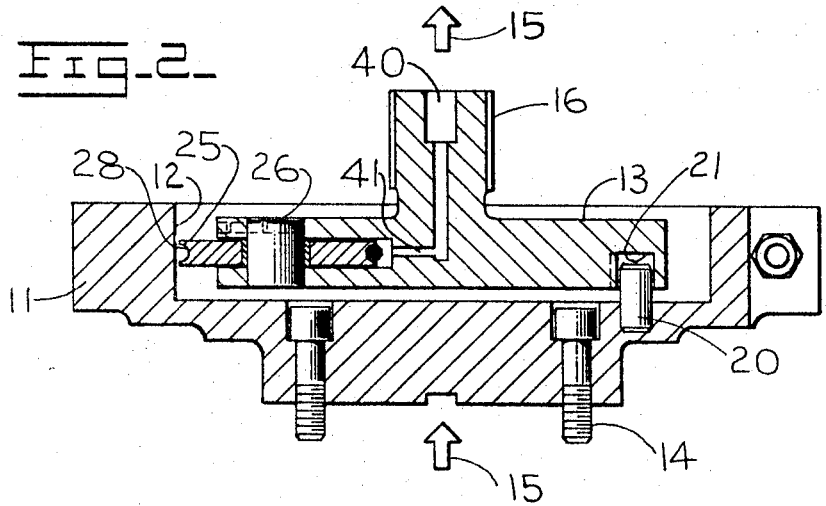
FIG. 2 is a horizontal section taken along line II—II of FIG. 1 showing additional construction detail.

For the suspension system, two or more sheaves 25 are mounted on shafts 26 about the periphery of the carrier unit with their rotational axis oriented parallel with that of the carrier unit, as can be seen in FIGS. 1 and 2. Pins 27 are received in registered bores in the shafts and carrier unit for retaining the shafts of the freely rotating sheaves, which normally are provided with circumferential grooves 28 for holding the cable loops which extends radially inwardly from the outer housing to support the carrier unit.

In the accompanying drawings the suspension is accomplished to the use of two separate cables 30 equipped with anchor bolts 21 attached to their ends. These cables or wire rope or other suitable filament material are used to suspend the carrier unit within the recess in the housing. Differing characteristics of these materials may be employed to tune out or dampen out vibration, along with adjustments in preloading.

The ends of each cable are anchored in the housing and have loops which project radially inwardly through apertures 33 in the housing and around an associated sheave for supporting the carrier unit, as can be seen in the drawings. Each cable is retained by retaining grooves 34 about the periphery of the housing between the apertures 33 and the anchor points 35. Normally, the sheaves can be removed to facilitate threading of the cable about the sheaves and then reassembled in the carrier unit.

Once the cable has been threaded as described above, nuts 32 can be adjusted to obtain any desired preload on the cables and centering of the carrier unit in the recess of the housing. Balanced tightening should be effected to prevent the shifting of a carrier unit out of axial alignment with the housing, but generally, the dowels, if evenly spaced, will prevent the carrier unit shifting.

Apertures 33 are carefully rounded so that a smooth shoulder 36 is formed where the cable leaves the inner opening of the apertures and extends its associated sheave. The shoulder is the only area of any significant cable movement during operation of the coupling since the sheaves will rotate to prevent any movement of the cable in the carrier unit.

To improve the service life of this novel coupling an axial oil passage 40 is provided in the carrier unit, and through radial passages 41, sprays oil on the cables looped around the sheaves as can be seen in FIG. 2. Centrifugal forces will carry the oil outwardly to the smooth, rounded shoulders 36 to provide lubrication in that area.

The above novel coupling construction can operate in the most adverse environments such as high temperatures while providing excellent vibration isolation. In fact, the preload in the particular suspension system can be adjusted to tune out or reduce vibration for a specific application and selected cable specifications may be chosen for desirable damping characteristics. In addition, the working area of the cable is lengthened and longer cable working lengths effect better damping.

While in the description only two sheaves were used to illustrate the invention, it should be understood that a plurality of sheaves and loops could be used to suspend the carrier within the recess of the housing, and is is only necessary that the sheaves and cable suspensions be arranged so that a balance of forces is achieved to suspend the carrier unit centrally within the housing.

An alternate construction could anchor the cables in the carrier unit and extend loops radially outwardly to sheaves mounted on the housing, though some advantages are lost in compactness and cable working length.

We claim:

1. An improved di-directional cable coupling including:
   a housing means having a circular recess centrally disposed therein;
   a circular carrier means loosely fitting into such circular recess without peripheral contact, said carrier having at least two sheave means mounted therein;
   a cable suspension system centrally supporting said circular carrier within said recess, said cable suspension system including a plurality of inwardly directed cable loops anchored in said housing, said cable loops coupling said sheave means with said housing in which they are anchored; and
   independent means to adjust the tension on each of said cable loops for suspending said carrier centrally in said recess and tensioning each of said loops.

2. The cable coupling as defined in claim 1 wherein both the housing means and the carrier means include means to attach them to shafts to be coupled with said coupling.

3. The cable coupling means as defined in claim 1 wherein dowel means are located on one of the means and cooperating arcuate slots are located on the other means for centering the carrier means within the circular recess of said housing means.

4. The cable coupling as defined in claim 2 wherein the cable is stranded filament material capable of isolating vibration between the housing means and the carrier means.

References Cited

UNITED STATES PATENTS

| 732,079 | 6/1903 | Hunt | 64—12 |
| 1,096,162 | 5/1914 | Fawcus | 64—12 |
| 1,522,980 | 1/1925 | Roco et al. | 64—12 |
| 3,011,324 | 12/1961 | Roubal | 64—12 |

FOREIGN PATENTS 357,501  11/1905  France.

HALL C. COE, Primary Examiner

U.S. Cl. X.R.

64—19